United States Patent Office 2,778,660
Patented Jan. 22, 1957

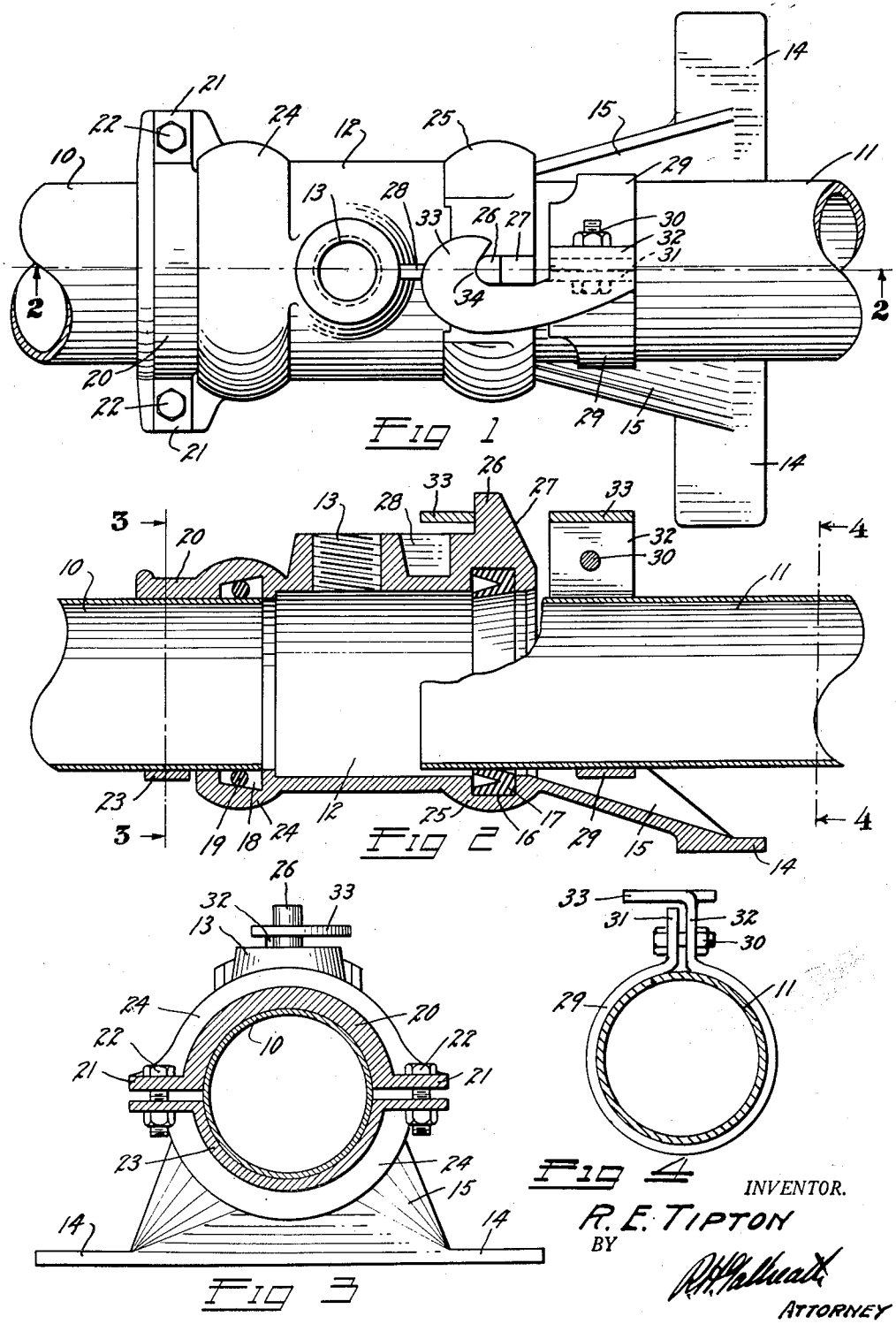

2,778,660

COUPLING FOR IRRIGATION PIPE

Ray E. Tipton, Denver, Colo.

Application February 8, 1954, Serial No. 408,891

1 Claim. (Cl. 285—6)

This invention relates to a coupling and nozzle support for above-ground irrigation pipes. Many couplings for pipe of this type employ hingedly mounted hooks for securing the pipe lengths to the coupling. These hinged hooks have been very unsatisfactory, due to the fact that the hinged hooks are constantly becoming accidentally disengaged due to vibration of the pipe by the flowing water and the rotating sprinklers and to the shifting of the pipe positions, either intentionally or accidentally.

The principal object of this invention is to replace the conventional hinged hook with a rigidly mounted hook which cannot move independently of the pipe length upon which it is mounted, so as to eliminate accidental unhooking of the pipe length.

Another object resides in the provision of a simple, lightweight, highly efficient coupling whereby a second pipe length can be quickly and easily coupled to a first length by simply forcing the second length toward the first length and giving the latter a slight rotation, and to provide a coupling in which the water pressure will act to fixedly lock the pipe lengths together and provide a fluid-tight joint.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved coupling, illustrating it in place on the extremity of a length of pipe with a second length of pipe inserted in the coupling;

Fig. 2 is a longitudinal section therethrough, taken on line 2—2, Fig. 1;

Fig. 3 is a cross-section, taken on the line 3—3, Fig. 2; and

Fig. 4 is a similar cross-section, taken through the second length of pipe, on the line 4—4, Fig. 2, with the first length of pipe and the coupling thereon omitted.

The improved coupling is illustrated applied between the extremities of a first pipe length 10 and a second pipe length 11.

The coupling comprises a barrel 12, the top of which is provided with an internally threaded boss 13 for receiving the nozzle riser of a conventional farm sprinkler system. The barrel 12 is supported on a relatively wide, transversely extending foot member 14 from which an inclined, semi-conical trough 15 extends upwardly and rearwardly to the bottom and sides of the forward extremity of the barrel 12. The latter extremity of the barrel is provided with an internal sealing ring groove 16 of rectangular cross-section. A resilient expansion ring 17 of V-shaped cross-section is positioned in the groove 16 with the open side of the V directed toward the interior of the barrel.

A second sealing ring groove 18 is formed internally about the rear extremity of the barrel 12. This second groove is provided with an inclined bottom so as to exert a wedging action on a second resilient sealing ring 19 to seal the latter about the extremity of the pipe length 10.

The barrel 12 is formed with circumferential bosses 24 and 25 to provide space for the ring grooves 18 and 16, respectively. A coupling lug 26 projects upwardly from the ring groove boss 25. The lug 26 is provided with a rounded rear face and is strengthened by inclining its forward surface, as shown at 27, and by means of a stiffening rib 28 extending between the boss 13 and the lug 26.

The barrel terminates at its rear extremity in a semi-cylindrical pipe yoke 20 which surrounds the upper half of the circumference of the pipe length 10. The yoke 20 terminates in two outwardly extending bolt ears 21 through which clamping bolts 22 pass to clamp a U-shaped clamp strap 23 against the bottom of the circumference of the pipe length 10. Thus, when the bolts 22 are tightened, the coupling is fixedly secured to the extremity of the pipe length 10.

The pipe length 11 is provided with an encircling band 29 adapted to be clamped about the pipe by means of a clamp bolt 30 which extends horizontally through upstanding ears 31 and 32 formed on the extremities of the band 29. The upper extremity of the ear 32 is turned at right angles over the ear 31 and extends rearwardly therefrom to form a flat attachment hook 33 designed to engage the coupling lug 26, as shown in Fig. 1. The hook 33 lies on a plane parallel to a plane tangent to the circumference of the pipe and is open to one side. The hooked extremity of the hook is provided with a lug-receiving socket 34 which fits about the rounded rear face of the lug 26.

Let us assume that the barrel 12 is fixedly attached to the first pipe length 10, and that it is desired to couple the second pipe length 11 thereto. It is only necessary to force the second pipe length 11 toward the coupling so that the extremity of the latter will enter and slide up the inclined trough 15 into the forward extremity of the barrel 12. Further forcing will force the extremity of the pipe length 11 through the sealing ring 17 until the hooked portion of the hook 33 can be swung clockwise behind the lug 26.

When water under pressure is turned into the pipes, it will tend to force the pipe length 11 outwardly from the coupling. This causes the rounded rear surface of the lug to firmly seat itself in the socket 34 of the hook to prevent relative rotation between adjacent pipe lengths. The water also enters the V-shaped groove in the sealing ring 16, expanding the latter radially between the pipe and the bottom of the ring groove 16, and also enters the ring groove 18 and acts against the sealing ring 19 to force it into the shallower portion of the groove so as to wedge it tightly against the pipe length 10.

Thus, it can be seen that the water pressure serves a double purpose, it serves to securely lock the two sections together and it serves to seal the coupling to the adjacent pipe lengths. Normally, the fit between the coupling and the pipe is relatively free and loose to allow limited angular movement between adjacent pipe lengths.

To release the pipe, it is necessary to shut off the water to relieve the pressure therein. The second length 11 can then be forced into the barrel 12 sufficiently to allow the hook 33 to be unhooked from the lug 26 by a slight counterclockwise rotation of the length 11. The relatively wide foot portion 14 rigidly supports the nozzle riser in a vertical position and resists rotation of the coupling when the lengths are being coupled and uncoupled.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A pipe coupling for two adjacent sections of above ground irrigation pipe, comprising a barrel on the forward end of each section, an internally threaded boss for the reception of a conventional form sprinkling nozzle on each barrel, a relatively wide transversely extending foot at the forward end of each barrel, an inclined semi-conical trough extending upwardly and rearwardly from said foot to the bottom and sides of said forward end of said barrel, said forward ends each being provided with an internal sealing ring groove, a resilient expansion sealing ring of V-shaped cross section in each groove, the forward end of each barrel also having a second sealing groove; each of said second grooves having a second sealing ring therein, and an inclined bottom to exert a wedging sealing pressure on said second sealing rings, a pair of spaced bosses to provide space for said grooves; a coupling lug having a rounded rear end projecting upwardly from the foremost of said bosses, a semi-cylindrical pipe yoke surrounding the upper half of each section adjacent the rear extremity of each barrel, outwardly extending bolt ears on each pipe yoke, a U-shaped clamp strap surrounding the lower half of each section, bolts clamping each said yoke and its adjacent clamp strap, an encircling band clamped adjacent the rear end of each section, two upstanding ears on each said encircling band, the upper extremity of one of said last mentioned ears being turned at right angles to the other of said ears and extending rearwardly from said last mentioned other ear to form a flat attachment hook lying in a plane parallel to a plane tangential to the circumference of said section, said hook being provided with a lug receiving socket adapted to engage about the rounded rear face of said coupling lug, the arrangement being such that one of said sections may be grasped at a point remote from its rear end, and its rear end, guided by said semi-conical trough into the barrel of the other of said sections, said hook being initially positioned out of alignment with said coupling lug, and rotated to engage said hook with said coupling lug to clamp said two sections together.

References Cited in the file of this patent
UNITED STATES PATENTS

| | | |
|---|---|---|
| 454,690 | Westaway | June 23, 1891 |
| 804,204 | Brown | Nov. 14, 1905 |
| 1,237,633 | Glazier | Aug. 21, 1917 |
| 2,327,572 | Wallis | Aug. 24, 1943 |
| 2,449,735 | Wyss | Sept. 21, 1948 |
| 2,464,466 | Stout | Mar. 15, 1949 |
| 2,672,356 | Crockett | Mar. 16, 1954 |